United States Patent [19]

Leimbach

[11] 4,117,281
[45] Sep. 26, 1978

[54] COMBINATION TIRE PRESSURE MONITORING SWITCH AND INFLATION VALVE

[75] Inventor: Richard C. Leimbach, Durham, N.C.

[73] Assignee: Eaton Corporation, Cleveland, Ohio

[21] Appl. No.: 775,663

[22] Filed: Mar. 8, 1977

[51] Int. Cl.² .......................................... H01H 35/24
[52] U.S. Cl. ................................................ 200/61.25
[58] Field of Search ............... 73/388 R, 146.5, 146.8; 340/58; 200/61.22, 61.25, 83 J, 83 Q, 83 U

[56] References Cited

U.S. PATENT DOCUMENTS

| 2,658,119 | 11/1953 | Jacobus | 340/58 X |
| 2,669,617 | 2/1954 | Sletten et al. | 340/58 X |
| 3,268,678 | 8/1966 | James | 200/61.22 |
| 3,430,196 | 2/1969 | Dalton | 200/61.25 X |
| 3,537,068 | 10/1970 | Amundsen, Jr. | 200/61.25 X |

FOREIGN PATENT DOCUMENTS 1,401,444  7/1975  United Kingdom ................. 200/61.25

*Primary Examiner*—James R. Scott
*Attorney, Agent, or Firm*—Frank M. Sajovec, Jr.

[57] ABSTRACT

A device for filling a pneumatic tire has associated structure which will activate a warning device when the tire's internal pressure falls below a predetermined value. The device has a valve stem and core to provide the filling function, and a diaphragm actuated electrical switch which signals when the pressure within the tire has dropped below the predetermined value.

4 Claims, 3 Drawing Figures

COMBINATION TIRE PRESSURE MONITORING SWITCH AND INFLATION VALVE

BACKGROUND OF THE INVENTION

1. Field of the Invention

In one aspect, this invention relates to tire inflation valves. In a further aspect, this invention relates to pressure change indicators.

2. Description of the Prior Art

An example of a combination tire pressure inflator and pressure change indicating device is shown in U.S. Pat. Nos. 3,800,736 and 3,910,223. In the known device, there are two chambers. One chamber provides a reference pressure, and the other chamber monitors the tire's internal pressure. When a pressure differential exists between the chambers, an indicator is activated which warns that the tire's internal pressure is low.

SUMMARY OF THE INVENTION

In general, the device of this invention permits filling therethrough a pneumatic tire and signals when the pressure within the tire has reached a predetermined value. The device has a valve stem adapted to be attached to a wheel rim, the stem having therein a longitudinal bore. A valve core is located within the longitudinal bore. The valve core normally prevents the passage of fluid through the longitudinal bore but, when activated, allows inflating fluid to be pumped into the tire and held there under pressure. A mounting means holds the valve stem in the wheel rim and has a duct with one end in fluid communication with the interior of the tire. A flexible diaphragm blocks the end of the duct remote from the interior of the tire, the diaphragm deforming in response to changes in pressure in the tire's interior. A member having an electrical contact is biased against the diaphragm and slides longitudinally along the axis of the valve stem as the diaphragm deforms. Stationary contact means attached to the mounting means is contacted by the sliding contact, as it moves, to open or close an electrical circuit. Electrical leads are connected to the stationary contact means and are adapted for connection to a remote indicator.

DESCRIPTION OF THE PREFERRED EMBODIMENT

Figure 1:
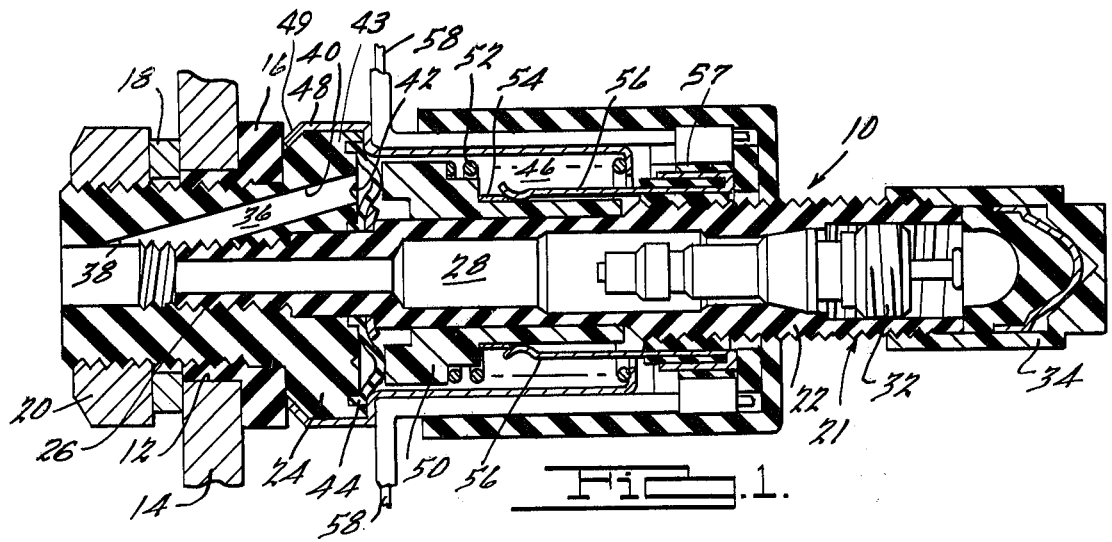
FIG. 1 is a sectional view of one embodiment of this invention showing the electrical contact means in the closed position.
Figure 2:
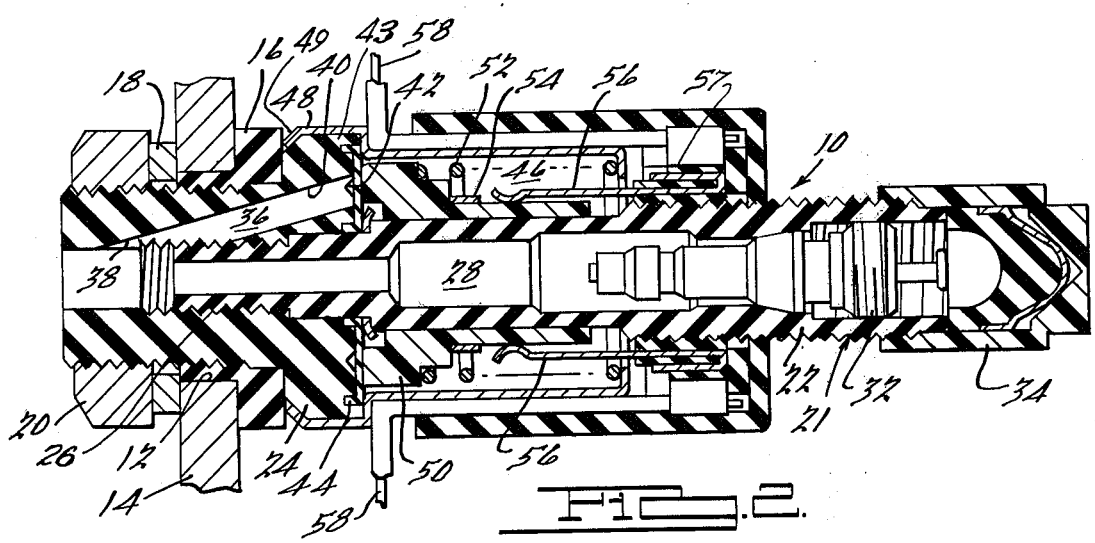
FIG. 2 is the embodiment of FIG. 1 wherein the pressure in the interior of the tire has decreased to a point where the electrical contacts are open.

Referring initially to FIGS. 1 and 2, the combination inflation valve and pressure change indicator 10 of this invention is mounted in an aperture 12 in the wall 14 of a pressurized container such as the rim of a tubeless tire. The indicator is mounted by means of grommet 16, washer 18, and a threaded nut 20 as illustrated in FIG. 1. Alternatively, the indicator could also be mounted in the manner of a snap-in valve stem, not shown, such mounting means being well known in the art.

The combination 10 includes a valve stem 21 having an upper section 22 and a lower section 24. The upper and lower sections 22, 24 are joined by any suitable means and preferably a threaded connection 26. The upper and lower sections of the valve stem cooperate to define an elongated bore 28 opening at one end into the tire. The end of the bore remote from the tire is sealed by means of a normally closed inflation valve 32 such as the standard tire inflation valve core known in the art. The core may be the type which is held in place by threads formed on the interior of the valve stem engaging a complimentary threaded surface on the valve core's exterior. A protective cap 34 may be employed if desired, and as illustrated is preferably threaded onto the exterior of the valve stem to protect the valve core from moisture and foreign matter.

As shown in FIGS. 1 and 2, the lower section 24 of the valve stem 21 has a connecting duct 36 therein, the longitudinal axis of the duct being disposed at an acute angle of preferably approximately 30 degrees to the longitudinal bore 28 of the valve stem. The leftward end 38 of the duct 36 in FIG. 1 is in fluid communication with the longitudinal bore 28 at a point near or within the interior of the tire and, therefore the duct is maintained at the same pressure as the tire's interior. The other or rightward end 40 of the duct terminates in an annular groove 42 which is circumferentially disposed about the face of a flange portion 43 provided on the lower section 24, the groove 42 also being exposed to pressure in duct 36 and thus to the tire's interior pressure.

A diaphragm 44 made from a deformable material, such as plastic or elastomeric, overlies the annular groove 42 and is sealed about the inner and outer margins thereof. A chamber 46 is formed on the rightward side of diaphragm 44 by a sealing cover 48 which engages the lower portion 24 of the valve stem about the periphery thereof, and preferably by a crimped edge 49. The diaphragm thus isolates duct 36 from chamber 46. As shown in FIG. 1, the diaphragm is deformed at elevated pressures and assumes a flattened condition when pressure within the tire is at a low level as shown in FIG. 2.

A plunger 50 is biased, by means of a spring 52, into contact with the diaphragm 44. The plunger has provided on the rightward end thereof in FIG. 1 an annular contact band 54 which is electrically conductive and moves longitudinally with the plunger.

Electrical contact means, such as the two stationary contacts 56, are mounted in an electrically insulated manner on the upper portion 22 of the valve stem 21. While two contacts are shown, a larger even number of contacts will preferably be used. The contacts would be shunted so as to form two groups of contacts which would operate in the same manner as the two contact arrangement shown. The contacts as shown in FIG. 1 are cantilevered arms with the rightward end of each mounted firmly to the valve stem by means of insulating means 57 and having attached thereto electrical leads 58.

In operation, the plunger 50 of the combination of FIGS. 1 and 2 moves rightward towards the upper part of the valve stem 21 under the influence of pressure and the diaphragm 44 is deformed. As the plunger 50 moves rightward, the annular contact 54 is brought into contact with the stationary contacts 56 completing an electrical circuit, through the electrical leads. This is the condition shown in FIG. 1. When the pressure in the tire falls below a predetermined level, the spring 52 will force the plunger 50 leftward towards the lower portion 24 of the valve stem 21 breaking the electrical continuity between contact band 54 and contacts 56. Remote indicator means, not shown, connected to the electrical leads may be provided to indicate the break in the circuit and activate a warning signal, thereby signalling the driver of the vehicle that the tire pressure should be restored to normal operating pressure.

Figure 3:
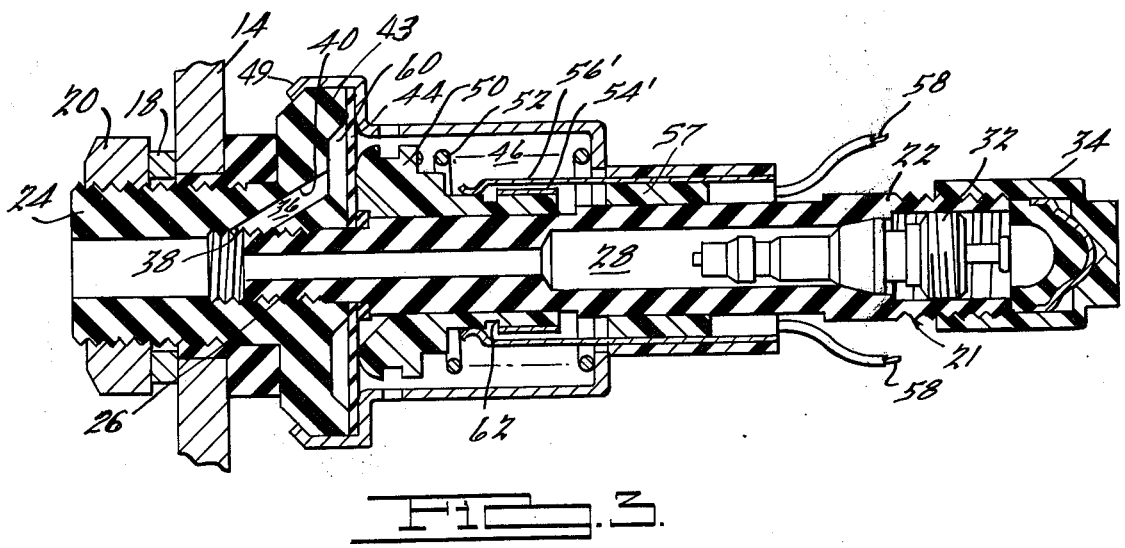
FIG. 3 is a sectional view of another embodiment of this invention wherein the contact means is arranged such that the electrical circuit is open at the proper inflation level.

FIG. 3 shows an alternative embodiment of this invention wherein the annular contact 54' is carried on the rightward end of the plunger remote from the diaphragm-contacting portion of the plunger 50 and the circuit is normally in an open condition. When the pressure within the tire falls below a predetermined value, spring 52 pushes the diaphragm 44 inwardly into an enlarged annular cavity 60 provided in the face of the portion 24. As the plunger 50 moves leftward in FIG. 3 towards the lower end 24 of the valve stem 21, the cantilevered contacts 56' will drop into an annular groove 62, the dropping action providing maximum certainty of the cantilevered contacts touching the annular contact 54' and completing the circuit. This sharp snapping action will insure a sound contact even when the contacts have a mild oxide buildup. Upon completion of the circuit, any remote indicator means connected to the electrical leads will sense the completed electrical circuit and warn the vehicle operator that the tire pressure is low.

Various modifications and alterations of this invention will become apparent to those skilled in the art from this disclosure. It is understood that this invention is not limited to the embodiments illustrated and described herein but is defined by the following claims.

What is claimed is:

1. An inflation valve and pressure switch for a pneumatic tire mounted on a wheel rim, comprising a body portion attached to said rim and extending through an aperture formed in said rim, said body portion having a first longitudinal bore formed therethrough, an elongated cylindrical stem member received in said first bore, said stem member having a second longitudinal bore formed therethrough opening at one end to the interior of the tire; a normally closed inflation valve received in the other end of said second bore; a cover member attached to said body and defining an annular chamber between said cover member and said stem member; a diaphragm attached to said body portion within said chamber, said diaphragm having one face exposed to the pressure within said annular chamber; a duct formed within said body, said duct communicating at one end and with the interior of said tire, and at the other end opening under the opposite face of said diaphragm to expose said opposite fact to the pressure within said tire; an annular plunger received over said stem; an electrical contact ring received over said plunger and attached thereto; first and second electrical contacts attached to said stem member in electrically insulated relationship to each other and in sliding contact with said plunger; and spring biasing means received within said chamber to bias said plunger into engagement with said diaphragm, said diaphragm being operable to move said plunger along said stem to bring said electrical contact ring into engagement with said electrical contacts when said opposite face of said diaphragm is exposed to a first pressure and to bring said ring out of engagement with said electrical contacts when said opposite face of said diaphragm is exposed to a second pressure.

2. Apparatus as claimed in claim 1 in which said spring biasing means comprises a compression spring acting between said cover and said plunger.

3. Apparatus as claimed in claim 1, in which said electrical contact ring is in engagement with said first and second electrical contacts when said opposite face of said diaphragm is exposed to a pressure equal to or higher than a predetermined pressure and out of engagement with said first and second electrical contacts when said opposite face is exposed to a pressure lower than said predetermined pressures.

4. Apparatus as claimed in claim 1, in which said electrical contact ring is out of engagement with said first and second electrical contacts when said opposite face of said diaphragm is exposed to a pressure equal to or higher than a predetermined pressure and in engagement with said first and second electrical contacts when said opposite face is exposed to a pressure lower than said predetermined pressure.

* * * * *